Sept. 1, 1936.　　　　J. R. REYBURN　　　　2,053,047
TIRE CHAIN
Filed Aug. 20, 1935　　　　2 Sheets-Sheet 1
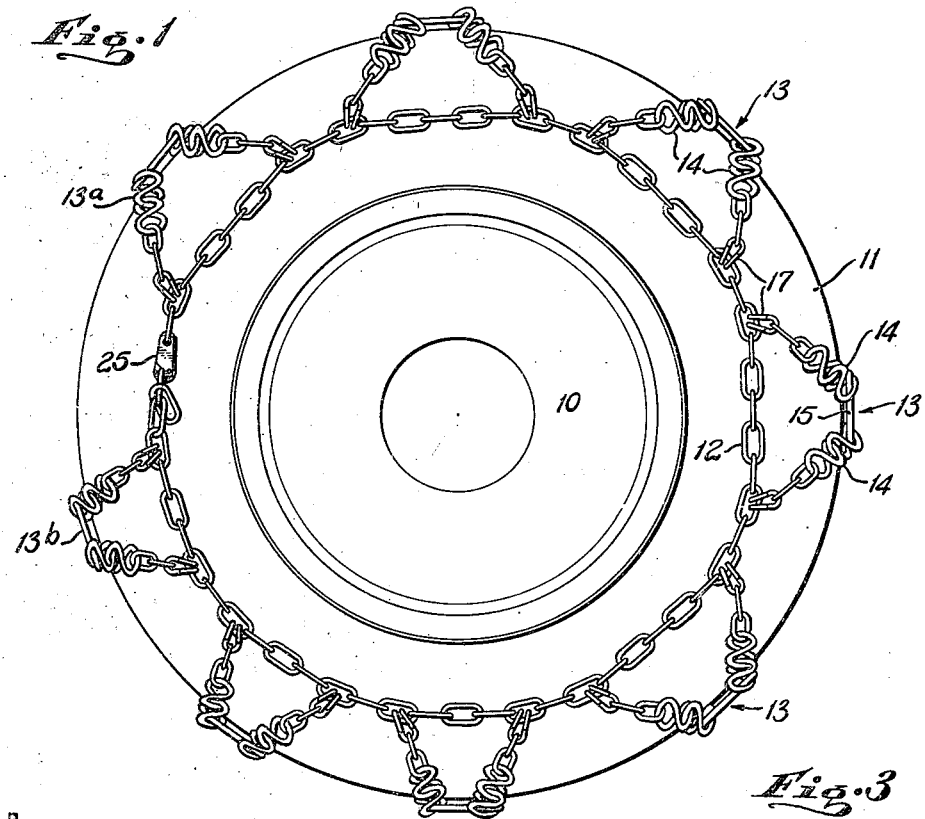
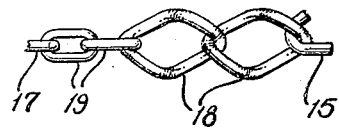
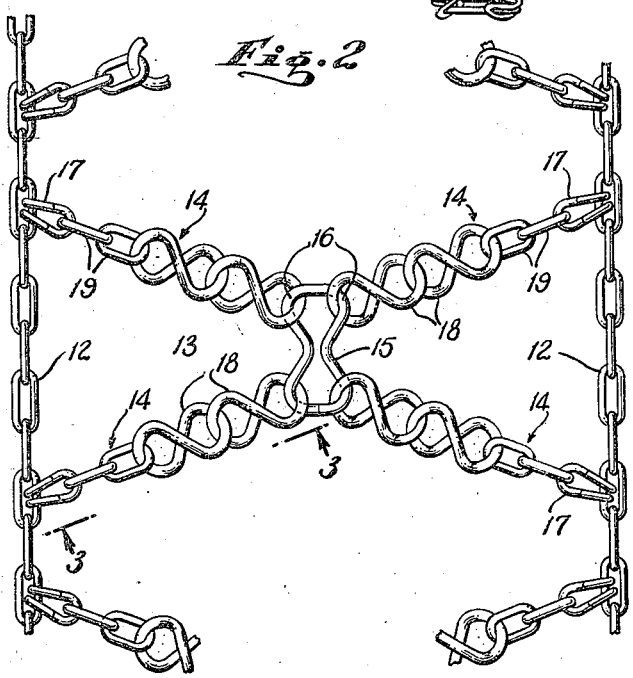
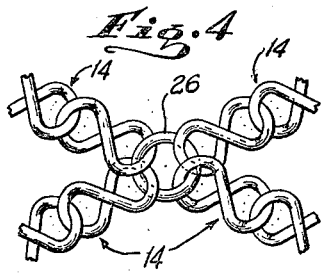
INVENTOR
JOHN R. REYBURN
BY Frederick S. Duneau
ATTORNEY

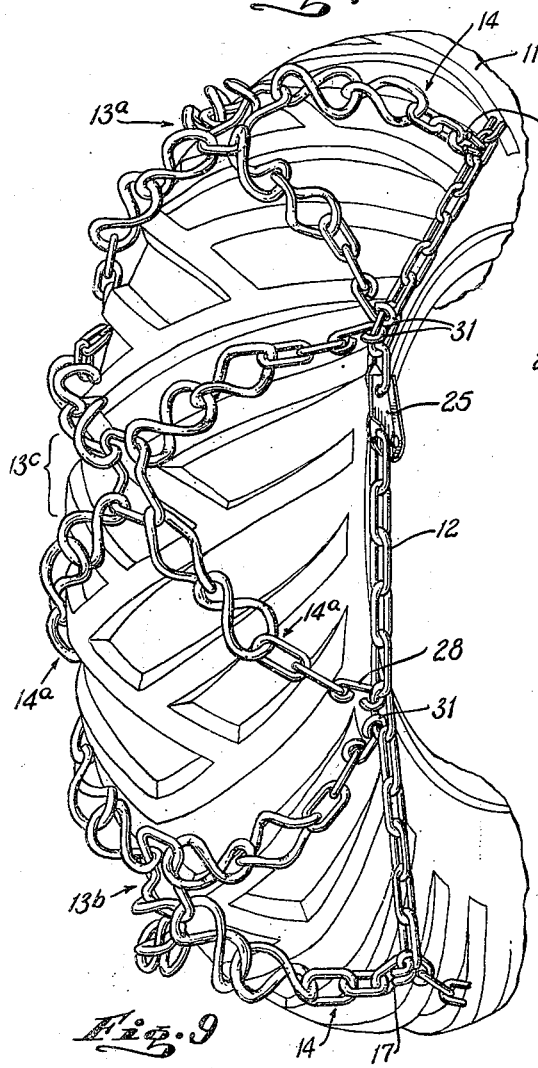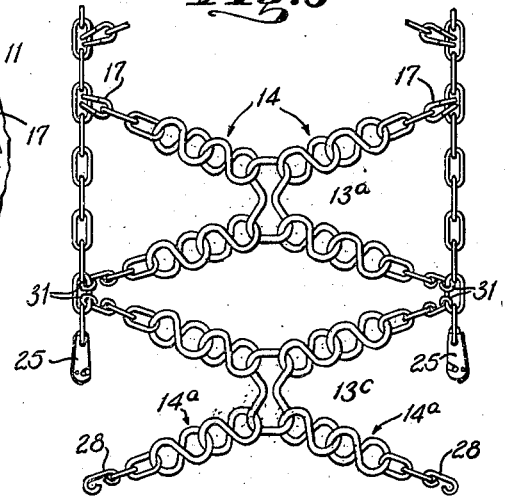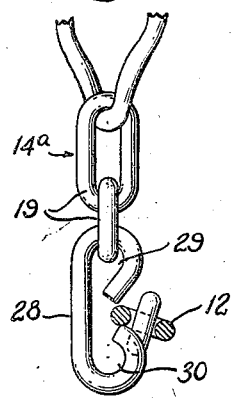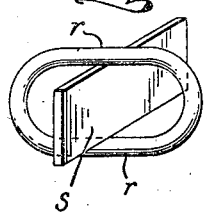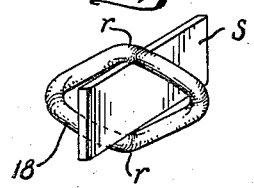

Patented Sept. 1, 1936

2,053,047

UNITED STATES PATENT OFFICE 2,053,047

TIRE CHAIN

John R. Reyburn, Fairfield, Conn., assignor to American Chain Company, Inc., a corporation of New York Application August 20, 1935, Serial No. 36,943

9 Claims. (Cl. 152—14)

The present invention relates to tire chains for motor vehicles and more particularly for vehicles such as farm tractors and the like which must be driven through mud, snow, and deep loose earth. Under such conditions of travel the ordinary tire chains are of little value, since they do not provide sufficient grip upon the soft material traversed. It has been the practice to provide tires with special mud grips or plates which have projecting flanges that dig deeply into the soft earth or mud thereby providing adequate traction. An object of the present invention is to provide a tire chain composed entirely of chain links but of such special construction as to offer very high resistance to slippage and thereby dispensing with the necessity of using the heavy plate-type of mud-grips.

A specific object of the invention is to provide a novel form of chain link for use in the cross members of tire chains, such links being so designed as to stand out from the tire to a much greater extent than do the ordinary cross chain links thereby materially increasing the grip of the wheel on the mud or loose earth upon which it travels.

Another object of my invention is to provide a tire chain consisting of side chains with cross chains connected in the form of a series of X's with a special link at the intersecting point of each X.

Since such tire chains must be adjustable to take up wear of the tire and of the chain as well, there is apt to be a greater gap between cross chains along the tread of the tire in the region where the side chains are joined than at other parts of the wheel, and another object of the present invention is to provide special means for closing this gap.

A more specific object of the invention is to provide what I term a "floating" cross chain section to bridge said gap, the floating section being permanently secured to one end of the side chains and having connectors for attachment to the side chains at any convenient point near the opposite end thereof, after the side chains have been coupled together.

Other objects and advantages of my invention will appear in the following description of a preferred embodiment and certain modifications thereof, and thereafter the novelty and scope of the invention will be pointed out in the claims.

In the accompanying drawings,

Figure 1 is a side view of a motor vehicle wheel fitted with my improved tire chain;

Fig. 2 is a plan view of a portion of the tire chain laid flat and showing the cruciform arrangement of the chain members in the cross chain sections;

Fig. 3 is a fragmental view, in side elevation, looking in the direction 3—3, of one of the cross chain members illustrating the wide outward projection of my improved cross chain links;

Fig. 4 is a fragmental view illustrating a different form of center link for connecting the cross chain members than that shown in Fig. 2;

Figs. 5 and 6 are views in perspective illustrating two steps in a process of forming my improved cross chain links;

Fig. 7 is a view in perspective of a portion of an automobile tire with my improved tire chain attached thereto, and illustrating particularly the floating cross chain section employed in the region where the side chains are coupled together;

Fig. 8 is a fragmental plan view of the tire chain shown in Fig. 5 with the side chains and the floating cross chain section disconnected; and Fig. 9 is a detail view of one of the detachable hooks employed on the free ends of the floating cross chain section.

Referring first to the structure shown in Fig. 1, an automobile wheel 10 is shown with the usual pneumatic tire 11 thereon and with a pair of side chains 12 (only one of which is shown in Fig. 1), connected by cross chain sections 13. As shown in Fig. 2 each of the cross chain sections consists of four chain lengths or members 14 arranged like the legs of a letter X and connected to a central link 15. This link is shown in Fig. 2 as of hour-glass form. In other words, it is so shaped as to provide four lobe portions 16 each of which is engaged by a chain member 14. The outer ends of these cross chain members are permanently secured by means of hooks 17 to the side chains 12. Each cross chain member comprises a pair of interlinked specially formed links 18 connected by flat loop links 19 to the hooks 17.

The links 18 differ from those ordinarily employed in cross chains, being constructed to stand out to a maximum extent from the tread surface of the tire. The shape of one of the links 18 will best be understood by explaining a method of forming the same. For instance a spacer S may be fitted between the side runs r of an ordinary flat link as shown in Fig. 5. The ends of the link are then twisted in opposite directions, each through an angle of 50 to 90 degrees as shown in Fig. 6. The central spacer may then be removed and the resulting link will be found to consist of two substantially helical sides connected at their ends to form a closed loop, the helices having a common axis but one helix being disposed about 180 degrees in advance of the other, as measured on an intersecting diametric plane. As a result there is a wide spacing between the runs of the link intermediate its ends so that they will stand out from the tire and thus provide a maximum grip on soft material upon which the wheel travels. Preferably the spacing between runs $r$ is not less than half the total length of the link. It will be understood that the above described method of making the links 18 is merely illustrative and that the links may be made in any other desirable manner.

The construction shown in Fig. 1 is typical of a tire chain in which the cross chain sections are uniformly spaced over a part of the tire, but are crowded together over another portion. For instance, a typical spacing consists of six links between legs of each section and two links between sections. However, if this spacing cannot be continued throughout the tire chain because of the size of the tire certain of the sections, as will be observed at the bottom and lower left-hand side of the wheel, may be arranged with only four links between the legs of each section.

The ends of the side chains are connected together by means of fasteners 25 in the usual manner. Instead of using an "hour-glass" link 15, the cross chain members may be connected to a central ring 26, as shown in Fig. 4. However, I prefer to use an hour-glass type of link, because it provides a greater spread between the cross chain members at their common intersecting point and thus distributes the gripping links 18 more uniformly about the periphery of the tire.

It will be observed that between the cross chain section 13a and 13b in Fig. 1 there is a broader gap than between other cross chain sections, this broader gap occurring in the region where the side chains are coupled together. To close such a gap I provide a "floating" cross chain section 13c, shown in Figs. 7 and 8. This floating section is similar to the other cross chain sections, but differs therefrom in the fact that the two outer legs 14a of the section are provided with detachable hooks 28. One of these hooks is shown in detail in Fig. 9. It consists of a rod bent to form a closed eye 29 at one end which is interlinked with an end link 19. The other end of the hook is bent to form an open eye 30 adapted to hook into a link of a side chain 12, but the shape of the link is such that the cross chain must be twisted (as shown in Fig. 9) out of normal position before it can be inserted between the two eyes and interlinked with the open eye 30. The link will then be prevented from unhooking accidentally by the overlying substantially closed eye portion 29, and the fact that there is only a narrow space between the eyes 29 and 30 through which the link may be withdrawn and then only when the plane of hook 28 is substantially perpendicular to the plane of the side chain link.

Since the permanently attached ends of the "floating" cross chain section 13c and the adjacent ends of the fixed section 13a are preferably attached to the same side chain links I prefer to use single closed hooks 31 at these points instead of the double hooks 17.

In operation the tire chain is placed upon the tire and the two side chains are coupled together in the usual manner. Thereafter the free ends of the floating section are hooked to links of the side chain, thus filling up the gap which normally occurs at the tread in the region where the side chains are coupled together. Since the floating tire chain section is provided with a pair of detachable ends, it may be drawn as tightly as desired and hooked to the links of the side chain which will give it the desired tension.

It will be understood that in a farm tractor or other such vehicle which moves relatively slowly through mud or soft ground, it is much more important to prevent any material gap in the gripping surface of the wheel than on a vehicle which travels at relatively high speed, because when the portion of the tire which is not provided with gripping chains engages the soft surface, the wheel speeds up and gathers sufficient momentum to overcome the gripping action of the next cross chain sections and such slippage gradually increases until the entire wheel slides around without obtaining adequate hold on the surface. This difficulty is overcome by the use of my floating cross chain section.

Another advantage of using an open link in place of a paddle-like plate is that the open link does not act like a shovel to scoop out material and dig the wheel into the mud or soft earth. Still another advantage of the open link is that it will slide and roll over an obstruction such as a hidden rock and thereby prevent serious shocks which might cause a fracture in the driving parts of the machine.

One of the advantages of my improved link is that it presents substantially the same transverse area in whatever angular position it may occupy, so that when it rolls over an obstruction there is no loss of gripping surface. In this respect the link differs from the ordinary twisted link which is broader than it is high and presents its greatest gripping area only when lying on edge.

Having thus described my invention what I claim as new and desire to protect by Letters Patent is as follows:

1. A chain link for tire chains, said link being composed of metallic wire and comprising two widely spaced substantially parallel and substantially helical elements connected at their ends to form a closed loop, each helix subtending an angle of at least 100 degrees and not more than 360 degrees about the axis of the two helices.

2. A chain link for tire chains, said link being composed of metallic wire and comprising an elongated closed loop with the sides thereof widely spaced apart and with the ends thereof oppositely twisted each through an angle of not less than 50 degrees nor more than 90 degrees from a central transverse line connecting the sides of the loop.

3. A chain link for tire chains, said link consisting of an elongated closed loop of metallic wire twisted substantially helically through an angle of not less than 100 degrees with the median spacing of the side elements of the loop equal to substantially one-half the length of the loop.

4. A tire chain comprising a pair of side chains, and cross chains connecting the side chains, each cross chain including certain twisted links, each of said links consisting of an elongated closed loop of metallic wire twisted substantially helically through an angle of not less than 100 degrees and with the median spacing of the side elements of the loop being not less than half the length of the loop.

5. A tire chain comprising a pair of side chains, and cross chains arranged in cruciform sets connecting the side chains, each cross chain including certain twisted links, each of which links consists of an elongated closed loop of metallic wire twisted substantially helically through an angle of not less than 100 degrees and with the median spacing of the side elements of the loop equal to substantially half the length of the loop.

6. A chain link for tire chains, said link consisting of a closed loop of metallic wire having, as viewed in side elevation, the projected form of a figure eight with substantially circular lobes and, as viewed in plan, the projected form of an oblique parallelogram with rounded corners.

7. A chain link for tire chains, said link being composed of a closed loop of metallic wire of substantially saddle-like form with substantially parallel arcuate side elements and substantially parallel arcuate end elements, all of said arcuate elements being of substantially the same radius.

8. A chain link for tire chains, said link being composed of a closed loop of metallic wire of substantially saddle-like form with substantially parallel arcuate side elements and substantially parallel arcuate end elements, all of said arcuate elements being of substantially the same radius but with the axis of the side elements forming an acute angle with the axis of the end elements.

9. A chain link for tire chains, said link being composed of a closed loop of metallic wire of substantially saddle-like form with substantially parallel semi-circular side elements and substantially parallel semi-circular end elements, all of said elements being of substantially the same radius but with the axis of the side elements forming an acute angle with the axis of the end elements.

JOHN R. REYBURN.